No. 685,791. Patented Nov. 5, 1901.
W. H. PAYNE.
AIR FEEDING AND HEATING DEVICE FOR LAMPS.
(Application filed Aug. 15, 1900.)
(No Model.)
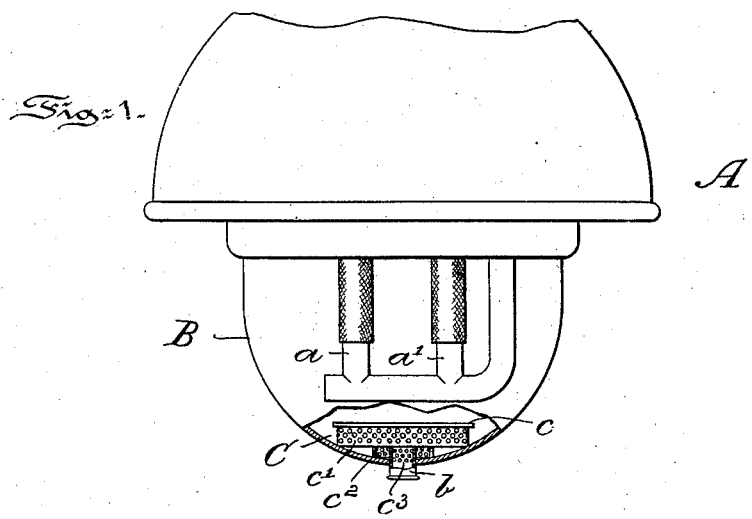
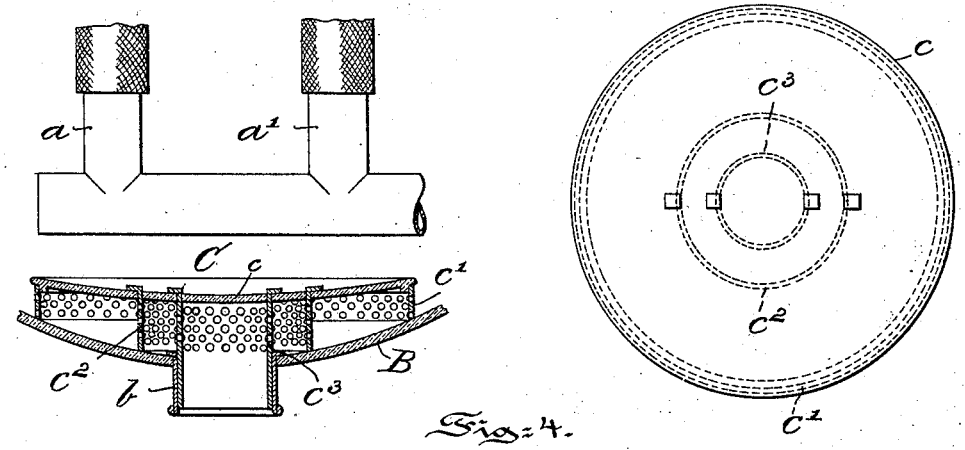
Witnesses:
Wilhelm Vogt
Thomas M. Smith
Inventor:
William H. Payne,
By J. Walter Douglas
Attorney.

UNITED STATES PATENT OFFICE.

WILLIAM H. PAYNE, OF CAMDEN, NEW JERSEY.

AIR FEEDING AND HEATING DEVICE FOR LAMPS.

SPECIFICATION forming part of Letters Patent No. 685,791, dated November 5, 1901.

Application filed August 15, 1900. Serial No. 26,903. (No model.)

*To all whom it may concern:*

Be it known that I, WILLIAM H. PAYNE, a citizen of the United States, residing at Camden, in the county of Camden and State of New Jersey, have invented certain new and useful Improvements in Air Feeding and Heating Devices for Lamps, of which the following is a specification.

My invention has relation to an air feeding and heating device for lamps, whether gas, vapor, or hydrocarbon, and of the type known as "suspended" lamps, in which the light is thrown downward through a bowl or globe inclosing the burner.

The principal object of my invention is to provide in a lamp having a globe or bowl through which the light is thrown downward and in which the burner and flame are inclosed by said globe or bowl, said globe or bowl having an opening in its wall for the admission of air, an air feeding and heating device comprising a plate formed of transparent or translucent material of greater diameter than the diameter of the opening in the globe, said plate located within said globe adjacent to the burner and flame and above the opening in the globe, whereby the air passing through the opening is deflected around the wall of the globe prior to its presentation to the burner and flame.

My invention, stated in general terms, consists of an air feeding and heating device for suspended gas, vapor, or hydrocarbon incandescent lamps when constructed and arranged in substantially the manner hereinafter described and claimed.

The nature, scope, and characteristic features of my invention will be more fully understood from the following description, taken in connection with the accompanying drawings, forming part hereof, in which—

Figure 1 is a front elevational view of a gas, hydrocarbon, or vapor burning incandescent lamp embodying in its construction the particular features of my present invention. Fig. 2 is a view, partly in enlarged elevation and central section, of the burners and the air feeding and heating device arranged adjacent to said burners, a portion of the surrounding globe or bowl for the burners of the lamp being also illustrated in section. Fig. 3 is a top or plan view of the air feeding and heating device, and Fig. 4 is an underneath plan view of the air feeding and heating device removed from the bowl or globe of the lamp.

Referring to the drawings, A represents a portion of a well-known type of suspended gas, hydrocarbon, or vapor burning lamp provided with burners $a$ and $a'$, which in the form of lamp illustrated in the drawings are arranged to heat a mantle of refractory material to incandescence. The light issuing from the burners of the lamp is projected downward through a glass bowl or globe B. The bowl or globe B is provided in the bottom with a throat or opening $b$ for the entrance of air.

C is the air feeding and heating device of my invention, preferably consisting of a dish-shape plate $c$ of glass, mica, or other translucent or transparent material and of a diameter larger than the diameter of the opening or throat $b$. This plate $c$ is preferably provided at or near its periphery with a perforated ring $c'$ and with preferably two concentric perforated rings or tubes $c^2$ and $c^3$, suitably connected with the plate $c$ and projecting downward therefrom. The central ring or tube $c^3$ is adapted to engage and fit snugly in the throat or opening $b$ of the bowl or globe B to support the plate $c$ within the bowl B and above the opening in said bowl or globe, as clearly illustrated in Figs. 1 and 2, whereby when the plate $c$, with the perforated rings $c'$, $c^2$, and $c^3$, is arranged as illustrated in Figs. 1 and 2 the air from without the lamp is sucked in through the throat or opening $b$ through the central perforated ring or tube $c^3$ and is deflected by the plate $c$ into the chamber or space between said tube or ring and the tube or ring $c^2$, then into the chamber or space between the ring $c^2$ and the ring $c'$ and through the interstices or openings of the latter ring around the wall of the globe or bowl, and is then presented to the burner or burners, thus supplying to the gas or vapors issuing from the respective burners $a$ and $a'$ heated air to support combustion and to enhance the illumination derived from the burners. The constant supply of air by deflection from the plate $c$ to the inside of the bowl or globe lessens the tendency of the latter to crack or break, because undue expansion by heat from the burners of the bowl or globe is prevented.

The device of my invention is preferably maintained firmly in position by the engagement of the outer perforated ring $c'$ with the bottom of the bowl or glass globe B and of the central ring or perforated tube $c^3$, with the throat or opening $b$ of the said globe or bowl surrounding the burners of the lamp. The plate $c$, being of either a transparent or translucent material, will not perceptibly obstruct the passage of light through the bowl or globe B. The air in its cool state enters from the exterior of the bowl through the throat $b$ and is deflected and heated prior to its presentation to the burners by the plate $c$ of the device.

Having thus described the nature and object of my invention, what I claim as new, and desire to secure by Letters Patent, is—

1. In a lamp provided with a depending globe or bowl inclosing the burner and flame and having an opening in its wall below the burner, an air feeding and heating device located wholly within the globe or bowl and comprising a transparent or translucent plate having a perforated downwardly-projecting rim interposed between the burner and the opening in the globe or bowl, and means for supporting the plate and rim above said opening, substantially as and for the purposes described.

2. In a lamp provided with a depending globe inclosing the burner, an air feeding and heating device, comprising a transparent or translucent plate having a series of concentric perforated rings depending downward from the plate, said plate and rings being inclosed in the globe and located adjacent to the burner, and a nipple or throat formed in the base of the globe and adapted to engage and support one of said rings, substantially as and for the purposes described.

In testimony whereof I have hereunto set my signature in the presence of two subscribing witnesses.

WILLIAM H. PAYNE.

Witnesses:
J. WALTER DOUGLASS,
THOMAS M. SMITH.